United States Patent
Snediker et al.

(10) Patent No.: US 7,143,976 B2
(45) Date of Patent: Dec. 5, 2006

(54) UAV ARRESTING HOOK FOR USE WITH UAV RECOVERY SYSTEM

(75) Inventors: John Snediker, Owings Mills, MD (US); Michael A. Watts, Bel Air, MD (US); Grant W. Corboy, Baltimore, MD (US)

(73) Assignee: Lockheed Martin Corp., Bethesda, MD (US)

( * ) Notice: Subject to any disclaimer, the term of this patent is extended or adjusted under 35 U.S.C. 154(b) by 0 days.

(21) Appl. No.: 11/051,842

(22) Filed: Feb. 4, 2005

(65) Prior Publication Data

US 2006/0175466 A1    Aug. 10, 2006

(51) Int. Cl.
*B64C 25/68* (2006.01)
(52) U.S. Cl. .................................. 244/110 G
(58) Field of Classification Search ............ 244/110 C, 244/110 F, 110 G, 110 R
See application file for complete search history.

(56) References Cited

U.S. PATENT DOCUMENTS

| | | | | |
|---|---|---|---|---|
| 1,647,619 A | * | 11/1927 | Hall | ........................ 244/110 R |
| 1,670,402 A | * | 5/1928 | Strong | ..................... 244/110 G |
| 1,748,663 A | | 2/1930 | Tucker | |
| 2,481,454 A | * | 9/1949 | Steele et al. | ............. 244/110 G |
| 2,486,397 A | * | 11/1949 | Feilbach | .................. 244/110 G |
| 2,486,418 A | * | 11/1949 | Jolly | ....................... 244/110 G |
| 2,488,050 A | * | 11/1949 | Brodie | .................... 244/110 F |
| 2,602,613 A | * | 7/1952 | Turner | ..................... 244/110 G |
| 2,668,031 A | * | 2/1954 | Martin et al. | ........... 244/110 G |
| 3,531,065 A | * | 9/1970 | Brown | .................... 244/110 G |
| 3,582,024 A | * | 6/1971 | Rhodes et al. | .......... 244/110 G |
| 4,147,317 A | | 4/1979 | Mayhew et al. | |
| 4,753,400 A | | 6/1988 | Reuter et al. | |

FOREIGN PATENT DOCUMENTS

WO    WO 01/07318 A1    2/2001

* cited by examiner

*Primary Examiner*—Timothy D. Collins
(74) *Attorney, Agent, or Firm*—DeMont & Breyer LLC

(57) ABSTRACT

A UAV arresting hook is disclosed. The arresting hook facilitates the capture of a UAV via a UAV recovery system. In the illustrative embodiment, the arresting hook has a rotation block, an arm, and a plurality of latches that are disposed on the arm. The arm is coupled to the UAV via the rotation block, which provides two rotational degrees of freedom to the arm. In a stowed position, the arm is flush against the surface of the UAV. To deploy the arm, a free end of the arm is rotated away from the surface of the UAV. The arm is additionally biased to rotate about its longitudinal axis as it rotates away from the surface of the UAV. This rotation positions the latches to capture an arresting line that is part of a UAV recovery system.

19 Claims, 5 Drawing Sheets

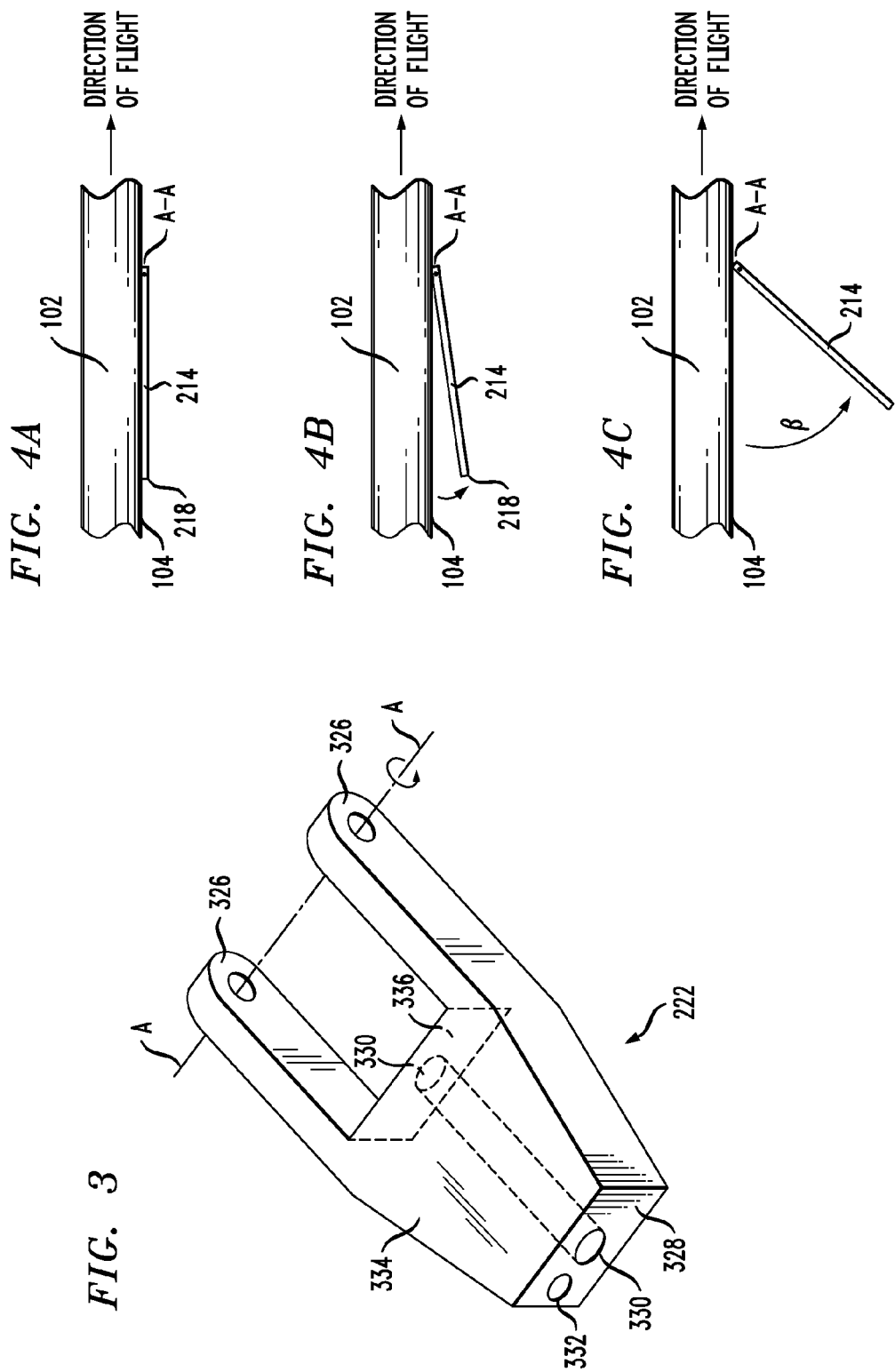

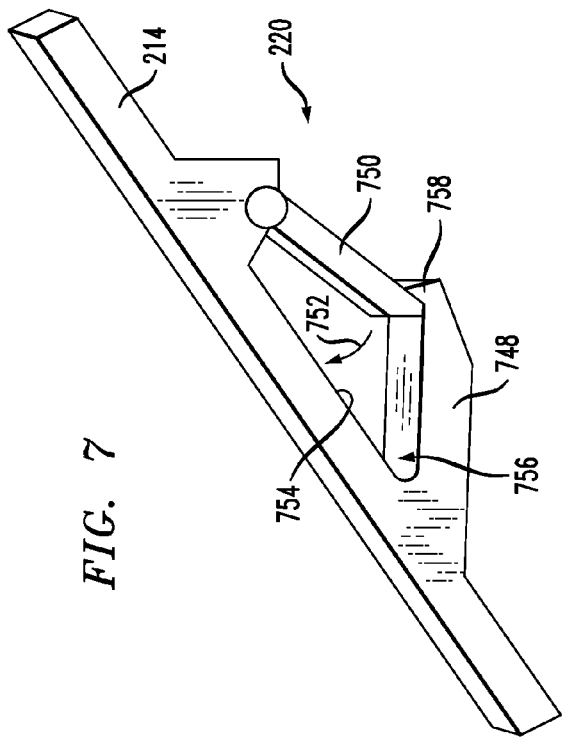
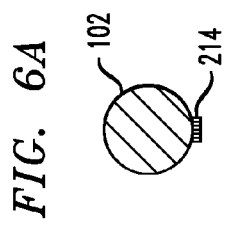
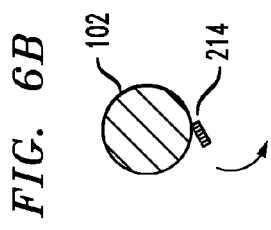
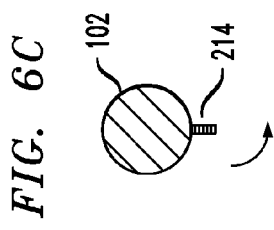

UAV ARRESTING HOOK FOR USE WITH UAV RECOVERY SYSTEM

The U.S. Government has a paid-up license in this invention and the right in limited circumstances to require the patent owner to license others on reasonable terms as provided for by the terms of Contract No. N00014-03-C-0408 awarded by the U.S. Government.

FIELD OF THE INVENTION

The present invention relates to systems for retrieving unmanned aerial vehicles ("UAVs").

BACKGROUND OF THE INVENTION

The UAV is now widely used for reconnaissance. Characteristically small, inexpensive, and pilot-less (i.e., unmanned cockpit), the UAV is ideal for that purpose.

Notwithstanding its low cost, the UAV is not considered to be a disposable item; recovery is at least attempted after each mission. Recovery is relatively straightforward when the UAV is operating over land. In such situations, the UAV is simply brought down on a makeshift landing field. Recovery is considerably more challenging, however, when the UAV is operating at sea. Due to the constant sway, roll, pitch and yaw of a ship at sea, it is quite difficult to safely land a UAV on the deck of a ship. In fact, deck landings are rarely attempted.

One alternative to the deck landing is the water "landing," wherein a UAV is simply ditched in the sea. This technique has its own drawbacks, including a reasonable likelihood of damage to the UAV and some risk to the recovery crew. A second alternative to a deck landing is to capture the UAV while it's still in flight.

U.S. Pat. No. 4,753,400 discloses a ship-mounted apparatus that recovers UAVs while they are in flight. The system disclosed in that patent includes a recovery net that is attached to a parachute. The net is also coupled, via a tow line, to a winch that is located on the deck of a ship. In use, the parachute floats the recovery net to a desired altitude for mid-air capture of the UAV. After capture, the recovery net and ensnared UAV are winched down to the deck.

The apparatus that is disclosed in U.S. Pat. No. 4,753,400 has several drawbacks. One drawback is that the apparatus disadvantageously requires a substantial amount of deck area. A second drawback is that a relatively labor-intensive untangling operation is required to free the UAV from the net. Furthermore, the relatively abrupt stop of a UAV in the recovery net can damage its fragile wings.

As a consequence, there is a need for a UAV recovery system that requires little deck space, enables rapid re-use of a UAV after recovery, and is less likely to damage a UAV than traditional recovery techniques.

SUMMARY OF THE INVENTION

The illustrative embodiment of the invention is a UAV having an arresting hook. The arresting hook described herein is intended for use with a UAV recovery system that uses a single "arresting line" as the primary UAV-recovery element. One such UAV recovery system is disclosed in applicant's co-pending U.S. patent application entitled "UAV Recovery System," Ser. No.11/050, 930, which is incorporated by reference herein.

In the illustrative embodiment, the arresting hook is coupled to the underside of the UAV about midway between the nose and tail. As used in this specification to refer to a surface of a UAV, the term "underside" means that portion of the fuselage that faces "down" (e.g., toward land, toward water, etc.) when the UAV is in level flight.

The arresting hook comprises an arm that includes a plurality of latches that are spaced apart along the length of the arm. In some embodiments, the arm is about 3 feet long. The arresting hook also includes an arrangement for rotatably coupling the arm to the UAV. In the illustrative embodiment, this arrangement comprises a rotation block.

The rotation block is coupled to a mounting bracket that is attached to the underside of the UAV. The rotation block is hinged to the mounting bracket so that the block is free to rotate away from the underside of the UAV. This enables the arm to move from a stowed position to a deployed position. In the stowed position, the arm is flush against the underside of the UAV. In the deployed position, the arm hangs down beneath the UAV, with the free end towards the tail of the UAV. In the illustrative embodiment, the arm rotates through about 45 degrees until it reaches its fully deployed position.

When the arm is deployed so that the latches can snag the arresting line of a UAV recovery system, the latches are facing in a "forward" direction (i.e., in the direction of flight). If the latches remained in this orientation when the arresting hook is in its stowed position against the underside of the UAV, they would be "sticking out" from the surface of the UAV. For some UAVs, there is very little clearance provided between the body of the UAV and its launcher. In such cases, there would be insufficient clearance to accommodate the latches.

To address this problem, the arm is rotated approximately 90 degrees about its longitudinal axis between the stowed and deployed positions. When the arresting hook is stowed, the latches are lying "on their side" against the underside of the UAV. In this orientation, the required clearance between the UAV and the launcher should be maintained, since the arm is much thinner (about 0.25 inches) than it is deep (about 1.5 inches). When the arresting hook is deployed, it rotates 90 degrees about its longitudinal axis so that the latches are facing the forward direction so that they can snare the arresting line of a UAV recovery system.

In the illustrative embodiment, the rotation is accomplished as follows. The arm of the arresting hook is rotatably coupled to the rotation block such that the arm is free to rotate about its longitudinal axis. A torsion spring, which is located on the rotation block, is attached to the arm. This creates a spring bias that urges the arm to rotate about its longitudinal axis. The arm is prevented from rotating in this fashion while it's held flush against the underside of the UAV. Once released, wherein one end of the arm falls away from the underside of the UAV, the arm is free to rotate about its longitudinal axis, and does so as a consequence of the bias provided by the spring.

The arm is, therefore, provided with two rotational degrees of freedom. One of the degrees of freedom enables an end of the arm to drop away from the fuselage of the UAV and the other enables the arm to rotate about its own longitudinal axis to re-orient the latches so that they are properly positioned to snag the arresting line. In the illustrative embodiment, it is the rotation block that provides these two rotational degrees of freedom.

In the illustrative embodiment, the arresting hook includes latches as opposed to simple hooks because it has been observed that when the arm is flown into the arresting line of a UAV recovery system, the arm tends to "bounce" off of the line. The latch (or other such closure mechanism)

prevents this from occurring. That is, once captured by a latch, any bounce that is experienced will not decouple the arm from the arresting line.

These and other features of an arresting hook in accordance with the illustrative embodiment, and variations thereof, are described further in the Detailed Description below and depicted in the accompanying Drawings.

BRIEF DESCRIPTION OF THE DRAWINGS

In FIG. 1, the arresting hook is in a deployed position.

In FIG. 2, the arresting hook is in a stowed position.

FIG. 3 depicts the rotation block of the arresting hook recovery operation wherein a UAV is snared in flight by the UAV recovery system.

FIGS. 4A–4C depict the deployment sequence the arresting hook, showing rotation of the arm away from the fuselage. This illustrates one of the two degrees of freedom of the arm of the arresting hook.

FIG. 6A depicts the arm in the stowed orientation and FIG. 6B depicts the arm in the deployed orientation.

FIGS. 6A–6C depict the deployment sequence of the arresting hook, showing rotation of the arm about its longitudinal axis. This illustrates one of the two degrees of freedom of the arm of the arresting hook.

FIG. 7 depicts a latch for use with the arresting hook.

DETAILED DESCRIPTION

Figure 1:
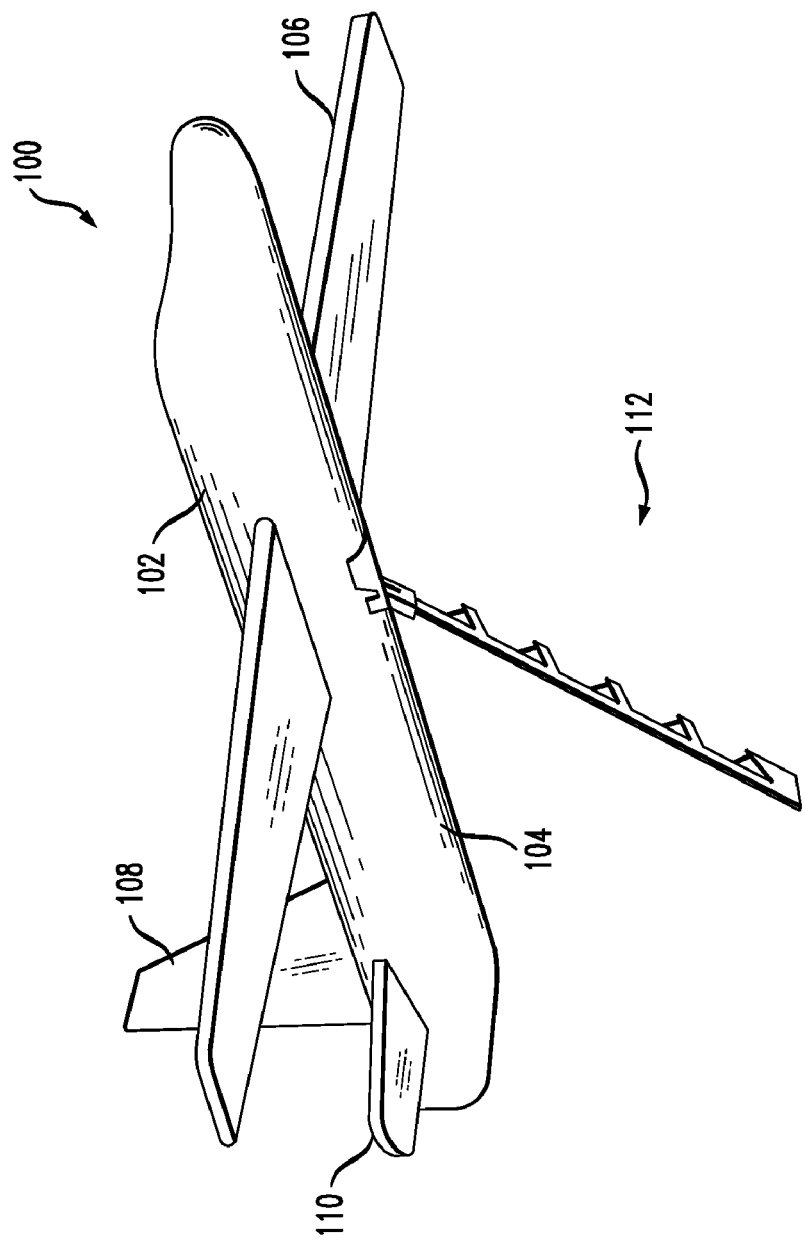
FIG. 1 depicts a UAV with an arresting hook in accordance with the illustrative embodiment of the present invention.

FIG. 1 depicts UAV 100 with arresting hook 112 in accordance with the illustrative embodiment of the present invention. In FIG. 1, arresting hook 112 is in a deployed position in preparation for snagging the arresting line (not depicted) of a UAV recovery system.

UAV 100 includes fuselage 102, wings 106, vertical stabilizer 108, horizontal stabilizers 110, and arresting hook 112. The arresting hook is coupled to underside 104 of fuselage 102.

Figure 2:
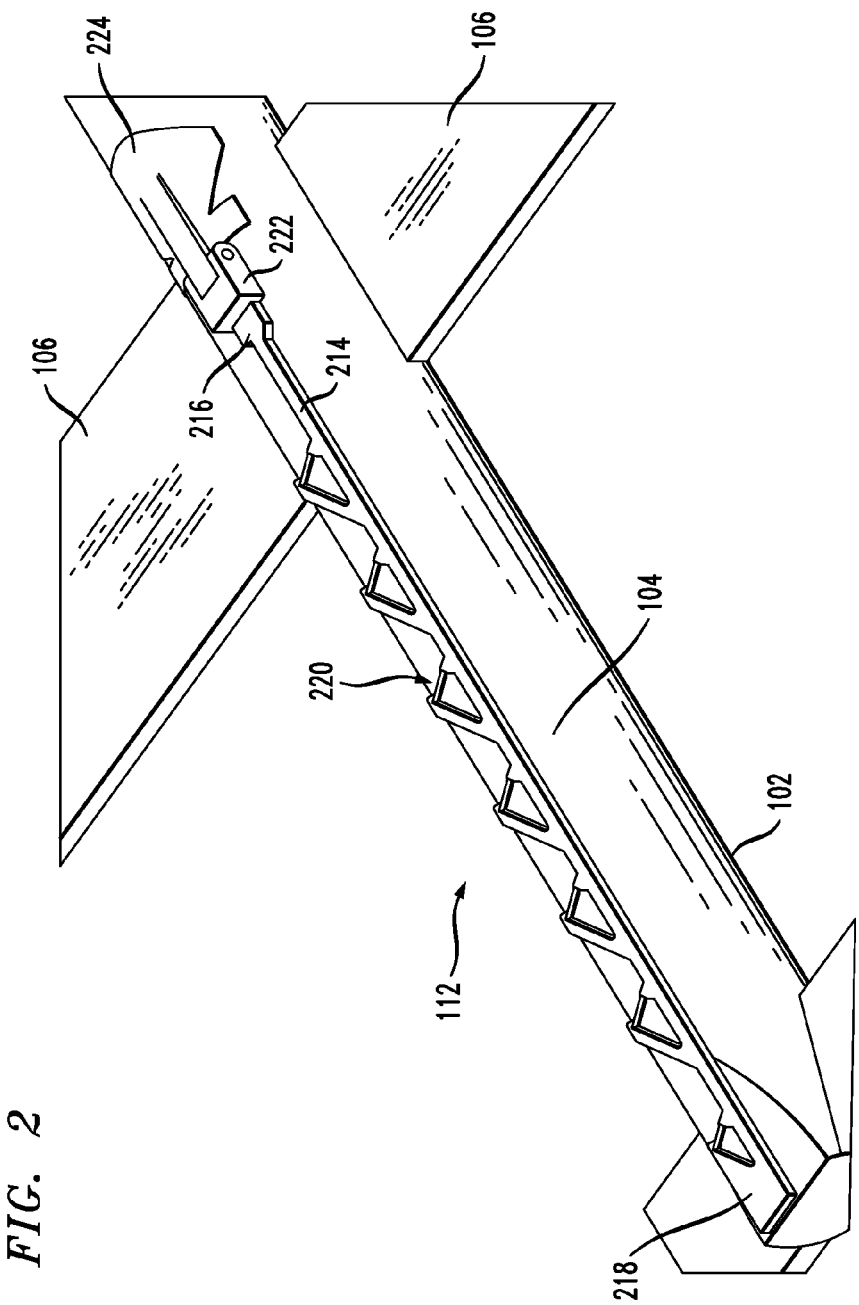
FIG. 2 depicts the arresting hook of FIG. 1 as viewed from the underside of the UAV.

FIG. 2 depicts the underside of UAV 100 and shows further detail of arresting hook 112. In FIG. 2, arresting hook 112 is in a stowed position. Arresting hook 112 is coupled to underside 104 of fuselage 102 via mounting bracket 224.

Arresting hook 112 comprises arm 214, a plurality of latches 220, and rotation block 222, structurally interrelated as shown. In the illustrative embodiment, arresting hook 112 is coupled to fuselage 102 at about the midpoint between the nose and tail of UAV 100.

Front end 216 of arm 214 couples to an arrangement that, in the illustrative embodiment, provides arm 214 with two rotational degrees of freedom. In the illustrative embodiment, this arrangement comprises rotation block 222, which is depicted in further detail in FIG. 3.

Rotation block 222 is also coupled to mounting bracket 224. Regarding the connection to the mounting bracket, holes 326 (FIG. 3) of rotation block 222 receive a pin, etc. (not depicted) from the mounting bracket. This enables rotation block 222 to rotate about axis A—A and, in turn, enables arm 214 to rotate away from the underside of fuselage 102. This represents a first rotational degree of freedom of arm 214.

The rotation about axis A—A is depicted in the simplified representations of FIGS. 4A through 4C, wherein back end 218 of arm 214 rotates away from underside 104 of fuselage 102. FIG. 4A depicts arm 214 prior to release. FIG. 4B depicts arm 214 as it begins to fall way from fuselage 102. FIG. 4C depicts arm 214 in the fully deployed position, wherein it has rotated through an angle $\beta$, which is typically within the range of about 30 to 60 degrees. This range of angles has been found to be acceptable for capturing the arresting line of a UAV recovery system. In some embodiments, angle $\beta$ is about 45 degrees.

The manner in which arm 214 is coupled to rotation block 222 is described with reference to FIGS. 3, 5A and 5B. Hole 330 of rotation block 222 receives a dowel or rod 538 (see FIGS. 5A and 5B) that depends from end 216 of arm 214. Hole 330 extends from face 328, at which it receives dowel 538, through body 334 of rotation block 222, and through to face 336. Dowel 538 protrudes (not depicted) from face 336 and is secured in a manner that enables the dowel—and arm 214—to rotate relative to rotation block 222. This rotation is about the longitudinal axis of the dowel. This movement, which is the second rotational degree of freedom of arm 214, will be referenced hereinafter as rotation about a longitudinal axis of arm 214.

Figure 5B:
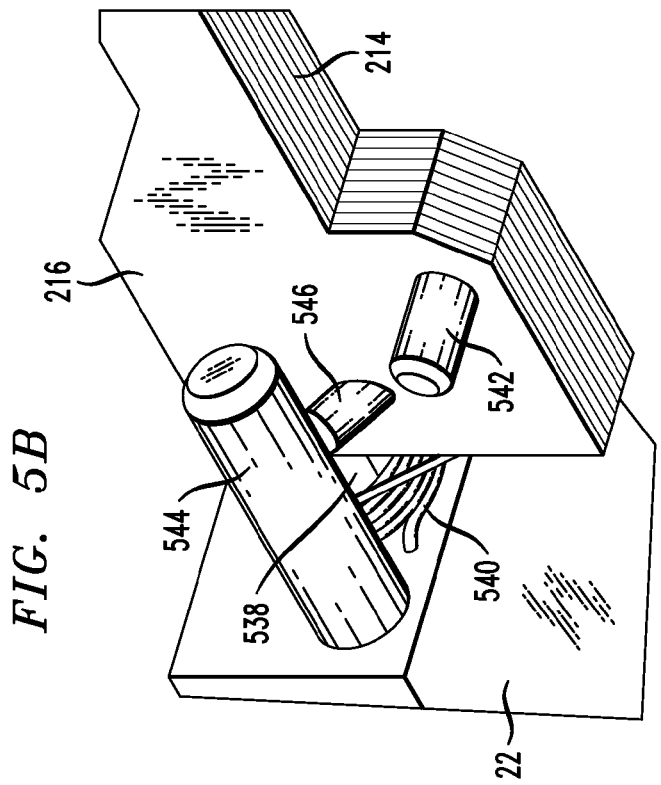
FIGS. 5A and 5B depict the coupling of the rotation block and the end of the arm, wherein a torsion spring is used to impart a spring bias to the arm.
Figure 5A:
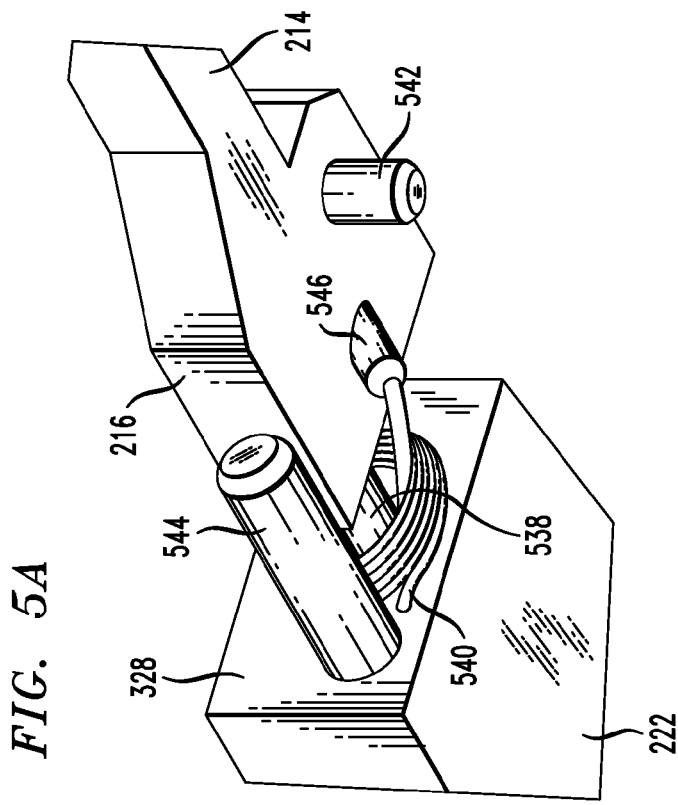

In FIG. 5A, the orientation of end 216 of arm 214 corresponds to the orientation that the arm takes in the stowed position, as depicted in FIG. 2. In that orientation, arm 214 is on its "side," lying flat against underside 104 of fuselage 102. It is notable that in this orientation, latches 220 are facing a direction that is approximately orthogonal to the direction of travel and, therefore, orthogonal to the direction that they must face in the deployed position to snag the arresting line of a UAV recovery system. For context, underside 104 of fuselage 102 would appear directly "above" rotation block 222 and end 216 in FIG. 5A.

In FIG. 5B, the orientation of end 216 of arm 214 corresponds to the orientation that the arm takes in the deployed position, as depicted in FIG. 1. In that orientation, latches 220 are facing the direction of motion of UAV 100. Relative to the orientation that is depicted in FIG. 5A, end 216 of arm 214 is rotated by about 90 degrees in a clockwise direction.

As implied above, this rotation is necessary to bring latches 220 to the proper orientation for snagging the arresting line of a UAV recovery system. To urge arm 214 to rotate about its longitudinal axis, a "biasing" arrangement is provided. In the illustrative embodiment, the biasing arrangement comprises torsion spring 540. The torsion spring is attached to rotation block 222 and end 216 of arm 214. In the orientation of arm 214 that is depicted in FIG. 5a, spring 540 is placed in tension. That tension urges arm 214 to rotate about its longitudinal axis. When arm 214 is in the stowed position, it is prevented from rotating by setscrew 542. The setscrew passes through end 216 and abuts underside 104 of fuselage 102.

When arm 214 is released (described further below) and begins to fall away from fuselage 102, end 216 of arm 214 is no longer constrained by setscrew 542 and is free to rotate about its longitudinal axis, as urged by torsion spring 540. To prevent arm 214 from over rotating, a stop is provided. In the illustrative embodiment, the stop comprises pins 544 and 546. Pin 544 protrudes from hole 332 in face 328 of rotation block 222 and pin 546 protrudes from a major surface of end 216 of arm 214. Pin 546 contacts pin 544 to stop rotation of arm 214.

FIGS. 6A–6C depicted simplified cross-sectional views of the rotation of arm 214 about its longitudinal axis. FIG. 6A depicts arm 214 lying flat against the underside of fuselage 102 in the stowed position. FIG. 6B depicts arm 214 during rotation about its longitudinal axis. This rotation is free to occur once arm 214 is released from its stowed position (see description below). FIG. 6C depicts arm 214 in a fully rotated (deployed) orientation. In this orientation, latches 220 are pointing in the direction of motion so that they will be able to snag the arresting line of a UAV capture system.

For simplicity, arm 214 has been depicted and described as a one-piece structure. In some embodiments, "front" end 216 of arm 214, including dowel 538, is an adapter (not depicted) that attaches to arm 214.

Referring now to FIG. 2, the "back" end 218 of arm 214 is weighted. In the illustrative embodiment, this weight is provided by the presence of additional "arm" material (e.g., steel, etc.). Back end 218 is held against fuselage 102 by a catch, not depicted. When it is time to deploy arresting hook 112, a signal is sent to UAV 100. The signal causes the UAV to release the catch that holds end 218 of arm 214. When the catch is released, end 218 begins to fall away from fuselage 102 (see, e.g., FIG. 4B), aided by the additional weight that is concentrated at end 218.

FIG. 7 depicts the illustrative embodiment of latch 220. As previously indicated, arm 214 includes a plurality of latches; for clarity, only one latch is depicted in FIG. 7. Latch 220 includes fixed hook 748 and movable gate 750. When an arresting line of a UAV recovery system contacts one of latches 220, the forward motion of UAV 100 against the arresting line causes gate 750 to swing inward in direction 752. The arresting line then slides down gate 750 and in toward surface 754 of arm 214. As UAV 100 continues to move forward, the arresting line clears gate 750 and slides along surface 754 toward region 756. The gate snaps back against stop 758 of hook 748, thereby trapping the arresting line within latch 220.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiment of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising an arresting hook, wherein said arresting hook comprises:

an arm;

a plurality of latches, wherein said plurality of latches depend from said arm;

an arrangement for coupling said arm to a surface, wherein said arrangement provides said arm with:

a first rotational degree of freedom, wherein said first rotational degree of freedom enables an end of said arm to rotate away from said surface; and a second rotational degree of freedom, wherein said second degree of freedom enables said arm to rotate about its longitudinal axis.

2. The apparatus of claim 1 wherein said surface is a portion of a fuselage of a UAV.

3. The apparatus of claim 2 wherein said arm is coupled to said surface at a point that is approximately midway between a nose and a tail of said UAV.

4. The apparatus of claim 1 wherein a mounting bracket is attached to said surface, and wherein said arrangement comprises:

a rotation block, wherein said rotation block is rotatably coupled to:

(i) said mounting bracket, wherein said coupling of said rotation block to said mounting block provides said first rotational degree of freedom; and (ii) said arm, wherein said coupling of said rotation block to said arm provides said second rotational degree of freedom.

5. The apparatus of claim 4 further comprising a biasing element, wherein said biasing element imparts a force to said arm that urges said arm to rotate about its longitudinal axis.

6. The apparatus of claim 5 wherein said biasing element comprises a torsion spring, wherein a first end of said torsion spring is attached to said rotation block and a second end of said torsion spring is attached to said arm.

7. The apparatus of claim 4 further comprising a stop, wherein said stop limits said rotation associate with said first rotational degree of freedom to an amount within a range of about 70 degrees to about 90 degrees.

8. The apparatus of claim 1 wherein said apparatus is a UAV, and wherein said apparatus further comprises a fuselage, and further wherein said surface is a portion of said fuselage.

9. The apparatus of claim 8 wherein said surface is disposed approximately midway between a nose and a tail of said UAV.

10. An apparatus comprising an arresting hook, wherein said arresting hook comprises:

an arm; wherein:

(i) said arm is coupled to a UAV;

(ii) said arm possesses two rotational degrees of freedom;

(iii) a second one of said two rotational degrees of freedom enables said arm to rotate about its longitudinal axis; and (iv) said arm is biased to rotate about said longitudinal axis; and a plurality of latches, wherein said plurality of latches depend from said arm.

11. The apparatus of claim 10 wherein a first one said two rotational degrees of freedom enables an end of said arm to rotate away from a surface of said UAV.

12. The apparatus of claim 10 wherein said end of said arm is rotated in accordance with said first rotational degree of freedom by an amount that is between about 70 to 90 degrees.

13. The apparatus of claim 11 wherein said arm is rotated in accordance with said second rotational degree of freedom by about 90 degrees.

14. The apparatus of claim 10 wherein said two rotational degrees of freedom are provided by a rotation block, wherein said rotation block couples said arm to said UAV.

15. The apparatus of claim 14 wherein a torsion spring is coupled to said rotation block and to said arm, and wherein said torsion spring provides said bias for said arm to rotate.

16. A method comprising:
flying a UAV toward an arresting line, wherein said UAV has an arresting hook, and wherein said arresting hook comprises an arm;
rotating a first end of said arm away from a surface of said UAV; and
rotating said arm about its longitudinal axis.

17. The method of claim 16 contacting said arm with said arresting line.

18. The method of claim 17 wherein said arm comprises a plurality of latches, wherein said method further comprises latching said arm to said arresting line.

19. The method of claim 16 further comprising receiving a signal to release said first end of said arm.

* * * * *